(12) United States Patent
Allmendinger et al.

(10) Patent No.: US 8,168,096 B2
(45) Date of Patent: May 1, 2012

(54) PROCESS FOR PRODUCING POLYSTYRENE FOAM PARTICLES HAVING A HIGH DENSITY

(75) Inventors: Markus Allmendinger, Edenkoben (DE); Klaus Hahn, Kirchheim (DE); Joachim Ruch, Wachenheim (DE)

(73) Assignee: BASF SE, Ludwigshafen (DE)

( * ) Notice: Subject to any disclaimer, the term of this patent is extended or adjusted under 35 U.S.C. 154(b) by 280 days.

(21) Appl. No.: 11/910,533

(22) PCT Filed: Apr. 5, 2006

(86) PCT No.: PCT/EP2006/061349
§ 371 (c)(1),
(2), (4) Date: Oct. 3, 2007

(87) PCT Pub. No.: WO2006/106120
PCT Pub. Date: Oct. 12, 2006

(65) Prior Publication Data
US 2009/0065960 A1    Mar. 12, 2009

(30) Foreign Application Priority Data

Apr. 6, 2005  (DE) .................. 10 2005 015 891

(51) Int. Cl.
*B29C 47/36*    (2006.01)
(52) U.S. Cl. ............... 264/14; 264/12; 264/41; 264/43; 264/51; 264/53; 264/54; 264/141; 264/142; 264/143

(58) Field of Classification Search .............. 264/12, 264/41, 51, 43, 53, 54, 141–413, 14
See application file for complete search history.

(56) References Cited

U.S. PATENT DOCUMENTS

| | | | | |
|---|---|---|---|---|
| 4,385,016 A | * | 5/1983 | Gwinn | 264/37.26 |
| 4,636,527 A | * | 1/1987 | Suh et al. | 521/79 |
| 6,297,292 B1 | | 10/2001 | Gluck et al. | |
| 6,342,540 B1 | * | 1/2002 | Gluck et al. | 521/56 |
| 2002/0117769 A1 | * | 8/2002 | Arch et al. | 264/54 |
| 2005/0156344 A1 | * | 7/2005 | Dietzen et al. | 264/51 |
| 2006/0167123 A1 | | 7/2006 | Dietzen et al. | |

FOREIGN PATENT DOCUMENTS

| | | |
|---|---|---|
| DE | 19813108 | 9/1999 |
| DE | 19819058 | 11/1999 |
| EP | 0305862 | 3/1989 |
| WO | 9948955 | 9/1999 |
| WO | 9948958 | 9/1999 |
| WO | 2004022636 | 3/2004 |

* cited by examiner

*Primary Examiner* — Christina Johnson
*Assistant Examiner* — Saeed Huda
(74) *Attorney, Agent, or Firm* — Connolly Bove Lodge & Hutz LLP

(57) ABSTRACT

A process for producing polystyrene foam particles having a bulk density in the range from 40 to 400 g/l by extrusion of a polystyrene melt comprising carbon dioxide and/or water as blowing agent through a nozzle and underwater pelletization, wherein the underwater pelletization is carried out at a pressure in the range 1-30 bar.

10 Claims, No Drawings

PROCESS FOR PRODUCING POLYSTYRENE FOAM PARTICLES HAVING A HIGH DENSITY

CROSS REFERENCE TO RELATED APPLICATIONS

This application is a National Phase of International Application No. PCT/EP2006/061349 filed on Apr. 5, 2006, which claims priority to Application No. 102005015891.9 filed in Germany on Apr. 6, 2005 under 35 U.S.C. §119; the entire contents of all are hereby incorporated by reference.

The invention relates to a process for producing polystyrene foam particles having a bulk density in the range from 40 to 400 g/l by extrusion of a polystyrene melt comprising carbon dioxide and/or water as blowing agent through a nozzle and underwater pelletization, wherein the underwater pelletization is carried out at a pressure in the range 1'-30 bar.

Polystyrene foams are usually produced with the aid of organic blowing agents, for example using volatile hydrocarbons, in particular pentane. For reasons of environmental protection, pentane emitted during the production and processing of EPS has to be recovered. This is complicated and costly. It is therefore sensible to replace these organic substances by acceptable blowing agents in the long term. One way of achieving this is the use of water as blowing agent.

WO 99/48955 and WO 99/48958 disclose processes for producing polystyrene foam particles from polystyrene beads comprising water as blowing agent. However, the processes described are relatively complicated, since slightly foamed pellets have to be produced in a first processing step and these can then be processed, after energy-intensive drying, to the actual, much lower densities.

DE-A 198 190 58 describes slightly foamed EPS particles which comprise organic blowing agents and have a coarse cell structure and can be produced by extrusion of a polystyrene melt comprising blowing agent and underwater pelletization in a waterbath having a temperature of from 50 to 90° C. and a pressure of from 2 to 20 bar.

WO 2004/022636 discloses a process in which extrusion of a polymer melt comprising water as blowing agent and a solubilizer leads directly to foam particles having a low density. This process is advantageous when the foam particles obtained are to be directly processed further to produce foams, since otherwise high transport costs are incurred because of the large volume.

It was an object of the present invention to find a simple process for producing polystyrene foam particles having a bulk density in the range from 40 to 400 g/l which makes do without organic blowing agents and caves a homogeneous foam structure.

We have accordingly found the process described at the outset.

Water, $CO_2$ or a mixture thereof is used as blowing agent, preferably in an amount of 1-5% by weight, based on the polystyrene melt. In general, no further blowing agents, solubilizers such as alcohols, ketones, ethers or esters or emulsifiers such as amphiphilic organic compounds are added to the polystyrene melt.

To produce the polystyrene foam particles according to the invention, the blowing agent is mixed into the polymer melt. The process comprises the steps a) production of the melt, b) mixing, c) cooling, d) conveying and e)-pelletization. Each of these steps can be carried out in the apparatuses or apparatus combinations known in plastics processing. Suitable apparatuses for mixing are static or dynamic mixers, for example extruders. The polymer melt can be taken directly from a polymerization reactor or can be produced directly in the mixing extruder or a separate melting extruder by melting polymer pellets. Cooling of the melt can occur in the mixing apparatuses or in separate coolers. Pelletization is effected by means of pressurized underwater pelletization. Apparatus arrangements suitable for carrying out the process are, for example:
a) polymerization reactor-static mixer/cooler-pelletizer
b) polymerization reactor-extruder-pelletizer
c) extruder-static mixer-pelletizer
d) extruder-pelletizer Furthermore, the arrangement, can have side extruders for introducing additives, e.g. solids or heat-sensitive additives.

The styrene polymer melt comprising blowing agent is generally extruded through the die plate at a temperature in the range from 140 to 300° C., preferably in the range from 160 to 240° C. Cooling to the region of the glass transition temperature is not necessary.

The die plate is heated at least to the temperature of the polystyrene melt comprising blowing agent. The temperature of the die plate is preferably from 20 to 100° C. above the temperature of the polystyrene melt comprising blowing agent. This prevents polymer deposits in the nozzles and ensures trouble-free pelletization.

According to the invention, pelletization is effected by means of underwater pelletization at a pressure in the range 1-30 bar, preferably in the range 2-12 bar. The density and thus the bulk density of the polystyrene foam particles can be set in a targeted manner via the variable counterpressure. While unfoamed, expandable polystyrene particles have a bulk density of about 600-700 g/l, the pressure in the process of the invention is selected so that slightly foamed polystyrene foam particles having a bulk density in the range from 40 to 400 g/l, preferably from 50 to 300 g/l, are obtained.

Furthermore, additives, nucleating agents, fillers, plasticizers, flame retardants, soluble and insoluble inorganic and/or organic dyes and pigments, e.g. IR absorbers such as carbon black, graphite or aluminum powder, can be added to the styrene polymer melt either together or physically separately, e.g. via mixers or side extruders. In general, the dyes and pigments are added in amounts in the range from 0.01 to 30% by weight, preferably in the range from 1 to 5% by weight. To disperse the pigments homogeneously in the styrene polymer on a microscopic scale, it can be advantageous, particularly in the case of polar pigments, to use a dispersant, e.g. organosilanes, polymers comprising epoxy groups or styrene polymers grafted with maleic anhydride. Preferred plasticizers are mineral oils, low molecular weight styrene polymers, phthalates, which can be used in amounts of from 0.05 to 10% by weight, based on the styrene polymer.

Surprisingly, the foam moldings according to the invention display, even in the presence of fillers, a high proportion of closed cells, with generally more than 60%, preferably more than 70%, particularly preferably more than 80%, of the cells of the individual foam particles being closed.

Possible fillers are organic and inorganic powders or fibrous-materials, and also mixtures thereof. Organic fillers which can be used are, for example, wood flour, starch, flax, hemp, ramie, jute, sisal, cotton, cellulose or aramid fibers. Inorganic fillers which can be used are, for example, silicates, barite, glass spheres, zeolites or metal oxides. Preference is given to pulverulent inorganic solids such as talc, chalk, kaolin ($Al_2(Si_2O_5)(OH)_4$), aluminum hydroxide, magnesium hydroxide, aluminum nitrite, aluminum silicate, barium sulfate, calcium carbonate, calcium sulfate, silica, quartz flour, Aerosil, alumina or wollastonite or spherical or fibrous, inorganic, materials such as glass spheres, glass fibers or carbon fibers.

The mean particle diameter or, in the case of fibrous fillers, the length should be in the region of the cell size or below. Preference is given to a mean particle diameter in the range from 1 to 100 µm, preferably in the range from 2 to 50 µm.

The properties of the expandable thermoplastic polymers and the foam moldings obtainable therefrom can be influenced via the type and amount of the fillers. The proportion of the filler is generally in the range from 1 to 50% by weight, preferably from 5 to 30% by weight, based on the thermoplastic polymer. In the case of filler contents in the range from 5 to 15% by weight no significant worsening of the mechanical properties of the expanded foams, e.g. flexural strength or compressive strength, is observed. The use of coupling agents such as styrene copolymers modified with maleic anhydride, polymers comprising epoxide groups, organosilanes or styrene polymers having isocyanate or acid groups can significantly improve the bonding of the filler to the polymer matrix and thus the mechanical properties of the foam moldings.

In general, inorganic fillers reduce the combustibility. In particular, the burning behavior can be significantly improved by addition of inorganic powders such as aluminum hydroxide.

Fillers having particle sizes in the range from 0.1 to 100 µm, in particular in the range from 0.5 to 10 µm, when present in the polystyrene foam at contents of 10% by weight result in a reduction in the thermal conductivity by 1-3 mW. For this reason, even small amounts of IR absorbers such as carbon black and graphite enable comparatively low thermal conductivities to be achieved.

To reduce the thermal conductivity, preference is given to using an IR absorber such as carbon black or graphite in an amount of from 0.1 to 10% by weight, preferably in an amount of from 2 to 8% by weight.

When small amounts of fillers, e.g. less than 5% by weight, are used, it is also possible to use carbon black in amounts of from 1 to 25% by weight, preferably from 10 to 20% by weight. At these high carbon black contents, the carbon black added is preferably mixed into the styrene polymer melt partly via the main stream extruder and partly via a side stream extruder. Addition via extruders makes it possible to achieve simple comminution of the carbon black agglomerates to a mean agglomerate size in the range from 0.3 to 10 µm, preferably in the range from 0.5 to 5 µm, and homogeneous coloration of the expandable styrene polymer pellets which can be foamed to give closed-celled foam particles. The expanded foams comprising from 10 to 20% by weight of carbon black which are obtainable after foaming and sintering achieve a thermal conductivity λ determined at 10° C. in accordance with DIN 52612 in the range from 30 to 33 mW/mK.

As carbon black, preference is given to using flame black having a mean particle size in the range from 60 to 150 nm, in particular in the range from 80 to 120, nm. The BET surface area is preferably in the range from 10 to 120 $m^2/g$.

As graphite, preference is given to using graphite having a mean particle size in the range from 1 to 50 µm.

As flame retardant, it is possible to use hexabromo-cyclododecane (HBCD), and as flame retardant synergist, it is possible to use bicumyl or dicumyl peroxide. The weight ratio of flame retardant synergist to organic bromine compound is generally in the range from 1 to 20, preferably in the range from 2 to 5.

To achieve better control of partial foaming, nucleating agents can be incorporated into the polymer melt. Inorganic or organic fillers in amounts of up to 50% by weight, preferably up to 30% by weight, also aid this.

To improve the expandability and the compatibility of the fillers with the polymer matrix, it is possible to add plasticizing additives or flow improvers, e.g. white oil, pentane or Joncryl ADF 1300 (from Johnson Polymers, MW=3000 g/mol) to the polystyrene pellets in amounts of from 0.01 to 20% by weight, in particular from 0.1 to 5% by weight.

In the process of the invention, no volatile organic compounds are comprised, and the density and foam structure can be set in a targeted manner as a result of the use of $CO_2$ or water as blowing agent.

The polystyrene foam particles according to the invention can be used for producing foam moldings. They are preferably foamed in steam or a gas mixture comprising at least 50%, by volume of water at temperatures of preferably from 100 to 130° C. to even lower bulk densities and subsequently fused to form foam moldings. To achieve particularly low bulk densities, for example less than 25 g/l, in particular from 8 to 16 g/l, foaming can be carried out in this way a number of times, with the pellets being temporarily stored and if appropriate dried between the foaming-steps.

EXAMPLES

Starting Materials

Polystyrene melt composed of Polystyrol PS 148G from BASF Aktiengesellschaft having a viscosity number VN of 83 m/g, a weight average molecular weight $M_W$=220 000 g/mol and a polydispersity Mw/Mn=2.8.

Examples 1-4

$CO_2$ or water as blowing agent was mixed into a polystyrene melt. After cooling of the melt comprising blowing agent from an original 260° C. to a temperature of 190° C., a filler together with polystyrene was, if appropriate, introduced into the main stream via a side stream extruder and the melt obtained was extruded at a rate of 60 kg/h through a die plate having 32 holes (diameter of each nozzle: 0.75 mm). Partially foamed pellets having a narrow size distribution were produced by means of pressurized underwater pelletization (8 bar). The amounts of blowing agents and fillers indicated in table 1 are based on the melt upstream of the die plate.

The partially foamed, dry particles were foamed further by means of steam at 120° C. for 2 minutes to a bulk density of 30 g/l in a prefoamer. A further reduction in the bulk density to 10 g/l was achieved by drying at 70° C. and subsequent treatment with steam at 120° C.

Foam moldings were obtained by introducing the prefoamed, dry foam particles into a block mold under pressure and treating them with steam at 120° C.

The foam structures of the foam moldings obtained were uniform with cell counts in the range from 2 to 12 cells/mm with a standard deviation of less than 5.

TABLE 1

| Example | Blowing agent [% by wt.] | Filler [% by wt.] | Pressure UWP [bar] | Bulk density [g/l] | Cell count/ standard dev. |
|---|---|---|---|---|---|
| 1 | 2% of $CO_2$ | — | 8 | 300 | 5.1/4.7 |
| 2 | 2% of $CO_2$ | 10% of chalk | 8 | 210 | 9.3/1.5 |
| 3 | 4% of $H_2O$ | — | 3 | 380 | 3.8/4.4 |
| 4 | 4% of $H_2O$ | 10% of chalk | 3 | 260 | 6.4/1.7 |

The invention claimed is:
1. A process for producing polystyrene foam particles by extrusion of a polystyrene melt comprising carbon dioxide and/or water as blowing agent through a nozzle and underwater pelletization, wherein the underwater pelletization is carried out via variable counterpressure at a pressure in the range 2-12 bar to set the bulk density of the polystyrene foam particles in the range from 40 to 400 g/l,
wherein no further blowing agents, solubilizers or emulsifiers are added to the polystyrene melt.

2. The process according to claim 1, wherein 1-5% by weight, based on the polystyrene melt, of carbon dioxide or water is used as blowing agent.

3. The process according to claim 1, wherein the polystyrene foam particles have a bulk density in the range from 50 to 300 g/l.

4. The process according to claim 1, wherein from 5 to 30% by weight, based on the melt, of a filler selected from the group consisting of as talc, chalk, kaolin, aluminum hydroxide, magnesium hydroxide, aluminum nitrite, aluminum silicate, barium sulfate, calcium carbonate, calcium sulfate, silica, quartz flour, Aerosil, alumina, and wollastonite, or a mixture thereof, are added to the polystyrene melt.

5. The process according to claim 4, wherein the filler has a mean particle diameter in the range from 2 to 50 micrometer.

6. The process according to claim 2, wherein the polystyrene foam particles have a bulk density in the range from 50 to 300 g/l.

7. The process according to claim 2, wherein from 1 to 50% by weight, based on the melt, of a filler are added to the polystyrene melt.

8. The process according to claim 3, wherein from 1 to 50% by weight, based on the melt, of a filler are added to the polystyrene melt.

9. The process according to claim 1, wherein 1-5% by weight, based on the polystyrene melt, of carbon dioxide and water is used as blowing agent and no further blowing agents are used.

10. The process according to claim 1, wherein from 5 to 30% by weight, based on the melt, of a filler are added to the polystyrene melt.

\* \* \* \* \*